(12) United States Patent
Smirnov et al.

(10) Patent No.: US 10,982,985 B2
(45) Date of Patent: Apr. 20, 2021

(54) HIGH FLOW TUBULAR BYPASS

(71) Applicant: Hitachi Metals, Ltd., Tokyo (JP)

(72) Inventors: Alexei V. Smirnov, Fort Collins, CO (US); Ryan Johnson, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 16/779,827

(22) Filed: Feb. 3, 2020

(65) Prior Publication Data

US 2020/0284631 A1 Sep. 10, 2020

Related U.S. Application Data

(60) Provisional application No. 62/813,355, filed on Mar. 4, 2019.

(51) Int. Cl.

| | |
|---|---|
| *G01F 1/684* | (2006.01) |
| *G01F 5/00* | (2006.01) |
| *G01F 1/76* | (2006.01) |
| *G01F 1/688* | (2006.01) |
| *G01F 1/696* | (2006.01) |

(52) U.S. Cl.
CPC ............ *G01F 1/6842* (2013.01); *G01F 1/688* (2013.01); *G01F 1/6847* (2013.01); *G01F 1/696* (2013.01); *G01F 1/76* (2013.01); *G01F 5/00* (2013.01)

(58) Field of Classification Search
CPC .......... G01F 15/005; G01F 1/48; G01F 1/684; G01F 1/6842; G01F 1/6847; G01F 1/688; G01F 1/696; G01F 1/76; G01F 1/88; G01F 5/00; F17D 1/00

See application file for complete search history.

(56) References Cited

U.S. PATENT DOCUMENTS

| | | | |
|---|---|---|---|
| 3,559,482 A | | 2/1971 | Baker et al. |
| 5,750,892 A | * | 5/1998 | Huang ...................... G01F 1/40 73/202 |
| 5,804,717 A | | 9/1998 | Lucas |
| | | | (Continued) |

OTHER PUBLICATIONS

Ohori, Tsutomu, "Internation Search Report and Written Opinion Regarding International Patent Application No. PCT/JP2020/007623", dated Jun. 9, 2020, p. 9 Published in: JP.

(Continued)

*Primary Examiner* — Francis C Gray
(74) *Attorney, Agent, or Firm* — Neugeboren O'Dowd PC

(57) ABSTRACT

Mass flow meters and mass flow controllers that include mass flow meters are disclosed. A mass flow meter includes a main flow path for a gas, and a bypass with a length, L, within the main flow path. The bypass includes a continuous flow section including a plurality of continuous capillary tubes that each have a length, L. The bypass also includes n flow segments forming n−1 spaces within the bypass where n is greater than or equal to 2, and each of the flow segments has a plurality of capillary tubes. The mass flow meter also includes at least one thermal sensor including a sensor tube, and the sensor tube is positioned across at least one of the flow segments to divert a portion of the gas around the at least one of the flow segments and provide a measured flow signal in response to the diverted portion of the gas.

10 Claims, 16 Drawing Sheets

(56) References Cited

U.S. PATENT DOCUMENTS

| | | | |
|---|---|---|---|
| 6,247,495 B1* | 6/2001 | Yamamoto | G01F 1/684 |
| | | | 137/487.5 |
| 6,361,206 B1 | 3/2002 | Bonne | |
| 2004/0123672 A1* | 7/2004 | Wang | G01F 5/00 |
| | | | 73/861.21 |
| 2006/0101908 A1* | 5/2006 | Meneghini | G01F 1/6847 |
| | | | 73/202.5 |
| 2008/0059084 A1* | 3/2008 | Wang | G01F 1/363 |
| | | | 702/47 |
| 2009/0007654 A1 | 1/2009 | Niikawa et al. | |
| 2013/0098484 A1* | 4/2013 | Speldrich | G01F 1/6842 |
| | | | 137/599.01 |

OTHER PUBLICATIONS

Ohmori, Tsutomu, "International Search Report and Written Opinion Regarding International Patent Application No. PCT/JP2020/007623", dated Jun. 9, 2020, p. 9 Published in: JP.

* cited by examiner

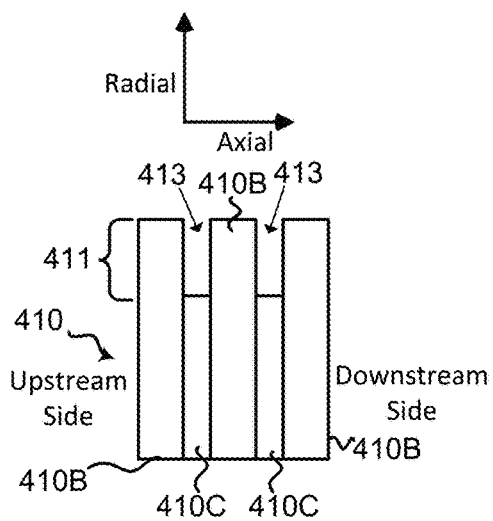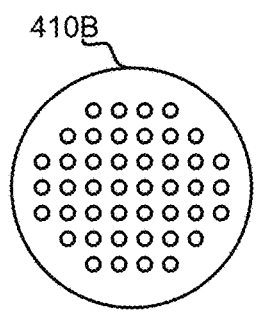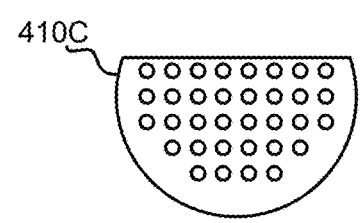
FIG. 4A    FIG. 4B    FIG. 4C
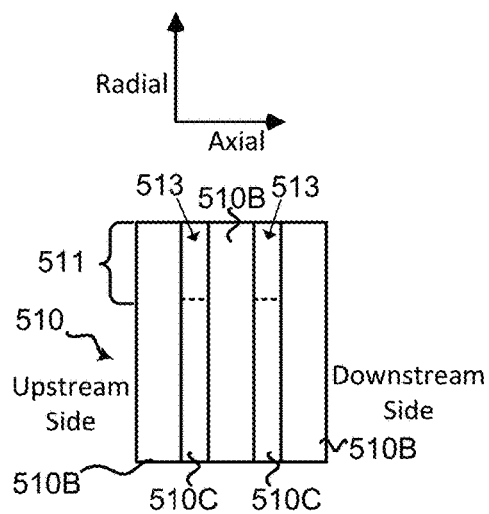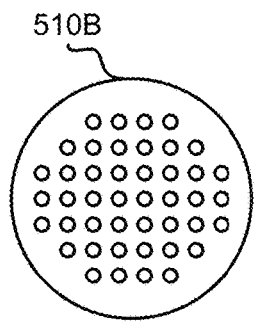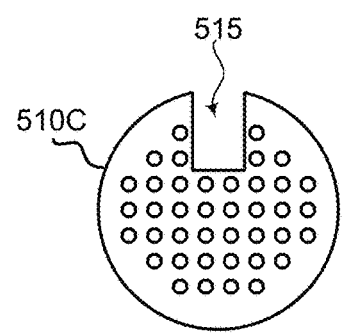
FIG. 5A    FIG. 5B    FIG. 5C

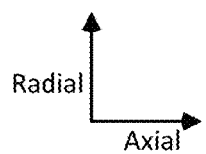
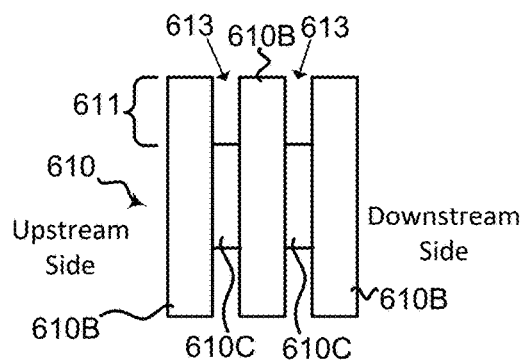
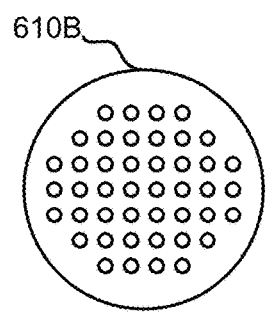
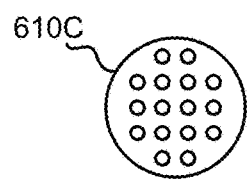
FIG. 6A          FIG. 6B          FIG. 6C
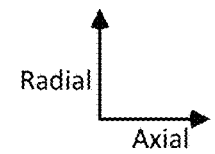
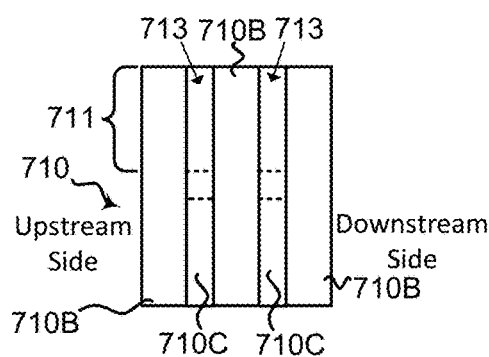
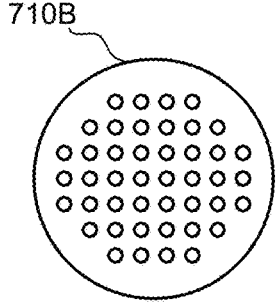
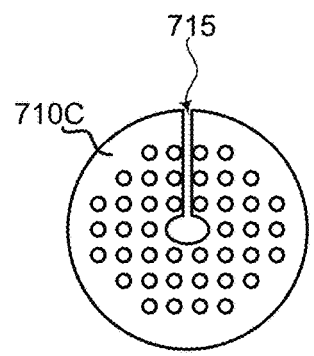
FIG. 7A          FIG. 7B          FIG. 7C

SECTION A-A

SECTION B-B

DETAIL H

DETAIL J

SECTION C-C

DETAIL K

SECTION D-D

SECTION E-E

SECTION F-F

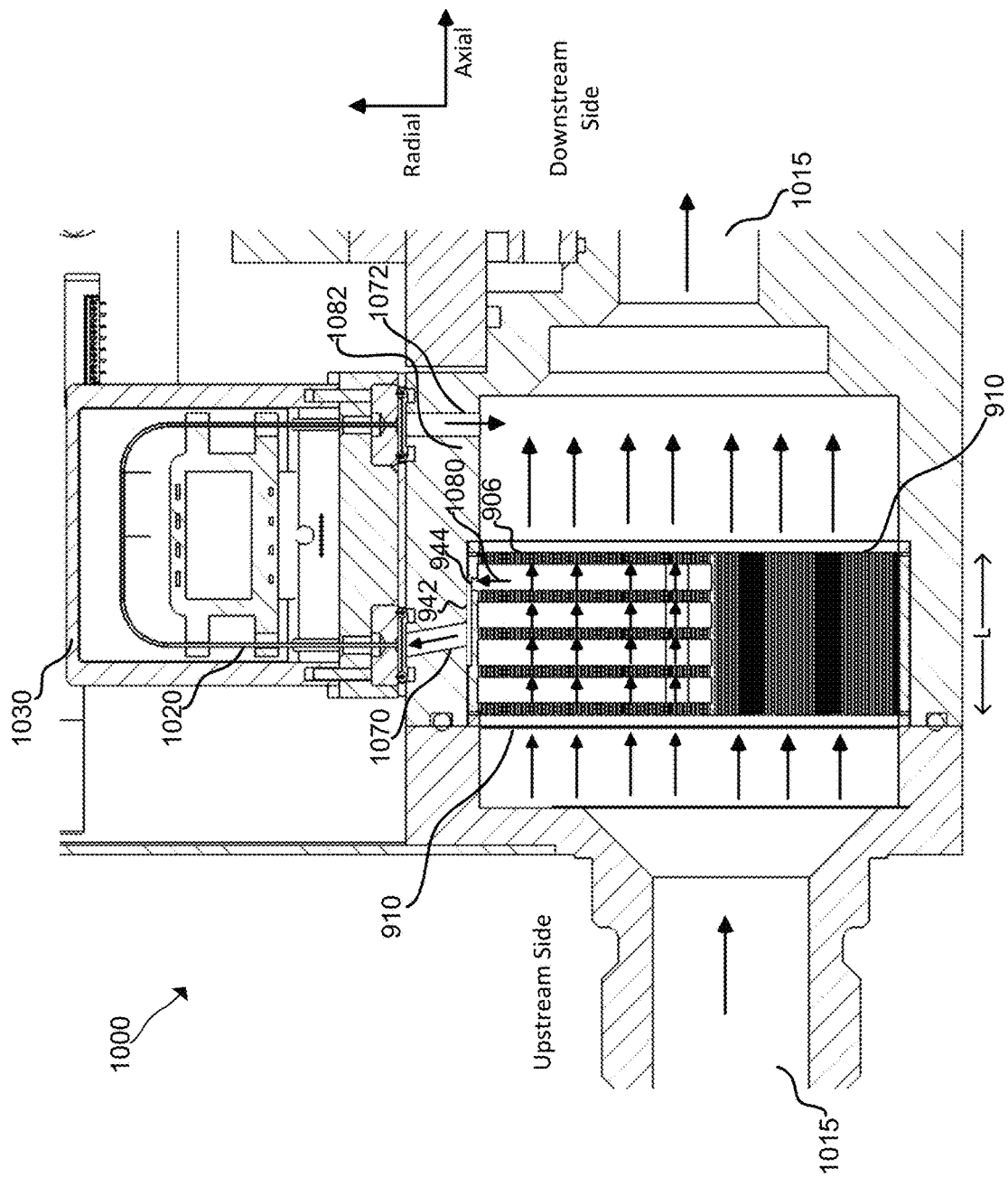

HIGH FLOW TUBULAR BYPASS

CLAIM OF PRIORITY UNDER 35 U.S.C. § 119

The present Application for Patent claims priority to Provisional Application No. 62/813,355 entitled "High Flow Tubular Bypass" filed Mar. 4, 2019, and assigned to the assignee hereof and hereby expressly incorporated by reference herein.

BACKGROUND

Field

The present disclosed embodiments relate generally to systems and methods for mass flow control. In particular, but not by way of limitation, the present disclosed embodiments relate to mass flow controller bypass design.

Background

A mass flow controller (MFC) is a device commonly used to control the flow of a gas to a desired location (e.g., processing chamber). As shown in FIG. 11, an MFC 1100 typically has a sensor, in this case a thermal sensor 1130, that is used to measure a mass flow rate of a gas passing through the MFC 1100. The thermal sensor 1130 does this by measuring the flow rate through a sensor tube 1120 that is connected to a main flow path 1115 of the MFC 1100. This flow rate measurement is communicated by way of a measured flow signal 1140 to a controller 1150 that adjusts a valve 1160 to achieve a desired flow rate depending upon the application.

As shown, the MFC 1100 includes a bypass 1110 through which a gas flows, and when operating properly, the bypass 1110 directs a constant proportion of the gas through a main flow path 1115 and the sensor tube 1120. As a consequence, the flow rate of the gas through the sensor tube 1120 is indicative of the flow rate of the gas flowing through the main flow path 1115 of the MFC 1100.

A high-flow MFC typically implements the bypass 1110 as a high-flow tubular bypass, which includes of a large number of tiny capillary tubes. When operating properly, the flow of the gas through these capillary tubes is laminar, so that the pressure drop across the bypass 1110 is linearly proportional to the flow. That pressure drop is applied to the sensor tube 1120, producing a very small flow through the sensor tube 920 that is still linearly proportional to the flow through the bypass 1110 and main flow path 1115.

SUMMARY

An aspect may be characterized as a mass flow meter that includes a main flow path for a gas and a bypass with a length, L, within the main flow path. The bypass includes a continuous flow section including a plurality of continuous capillary tubes wherein each of the plurality of continuous capillary tubes has a length, L. The bypass also includes n flow segments that form n−1 spaces within the bypass where n is greater than or equal to 2, and each of the n flow segments includes a plurality of capillary tubes. The mass flow meter also includes at least one thermal sensor including a sensor tube, and the sensor tube is positioned across at least one of the n flow segments to divert a portion of the gas around the at least one of the flow segments and provide a measured flow signal in response to the diverted portion of the gas.

Another aspect may be characterized as a mass flow meter that includes a main flow path for a gas and a bypass with a length, L, within the main flow path. The bypass includes: means for creating a pressure drop, dP, across the bypass, means for dividing the pressure drop across the bypass to provide a plurality of pressure drops, and means for accessing one or more of the plurality of the pressure drops. The mass flow meter also includes at least one thermal sensor including a sensor tube coupled to the means for accessing to position the sensor tube across one of the plurality of pressure drops to divert a portion of the gas through the sensor tube, and the at least one thermal sensor is also configured to provide a measured flow signal in response to the diverted portion of the gas.

BRIEF DESCRIPTION OF THE DRAWINGS

FIG. 4A is a side view of yet another bypass design;

FIG. 4B is a front view of a piece of the bypass depicted in FIG. 4A;

FIG. 4C is a front view of another piece of the bypass depicted in FIG. 4A;

FIG. 5A is a side view of yet another bypass design;

FIG. 5B is a front view of a piece of the bypass depicted in FIG. 5A;

FIG. 5C is a front view of another piece of the bypass depicted in FIG. 5A;

FIG. 6A is a side view of yet another bypass design;

FIG. 6B is a front view of a piece of the bypass depicted in FIG. 6A;

FIG. 6C is a front view of another piece of the bypass depicted in FIG. 6A;

FIG. 7A is a side view of yet another bypass design;

FIG. 7B is a front view of a piece of the bypass depicted in FIG. 7A;

FIG. 7C is a front view of another piece of the bypass depicted in FIG. 7A;

FIG. 10B is a front section view of a portion of the mass flow meter depicted in FIG. 10A.

DETAILED DESCRIPTION

Aspects of the present disclosure include various high flow tubular bypass embodiments. Applicant has found that high flow tubular bypass designs are faced with several challenging design requirements, which the prior art mass flow controller 1100 of FIG. 11 does not address. For example, the diameter of the capillary tubes must be small enough to ensure laminar flow with a small enough Reynolds number, e.g., less than 1000. Also, the capillary tube length-to-diameter ratio should be high enough, e.g., greater than 20, to avoid "Reynolds entrance effects." But a size of a housing of many mass flow meters and mass flow controllers constrain the geometry and total number of capillary tubes.

Design constraints, for example, may require the prior art bypass 1110 to have a relatively long length, and this relatively long length may cause a pressure drop that is higher than a desired-maximum pressure drop for the sensor tube 1120.

As a result, the pressure drop across typical designs of the prior art bypass 1110 is often higher than the optimal pressure drop for the sensor tube 1120, particularly if the flow rate is higher than 100 to 200 standard liters per minute (SLM). Consequently, the flow through the sensor tube 1120 can become too high, resulting in non-optimal operating conditions for the thermal sensor 1130, such as a loss of linear proportionality between the flow and a measured flow signal 1140 from the thermal sensor 1130.

As discussed herein, several embodiments of the present disclosure avoid exposing thermal sensors (such as the thermal sensor 1130) to a higher than optimal pressure drop.

Figure 1:
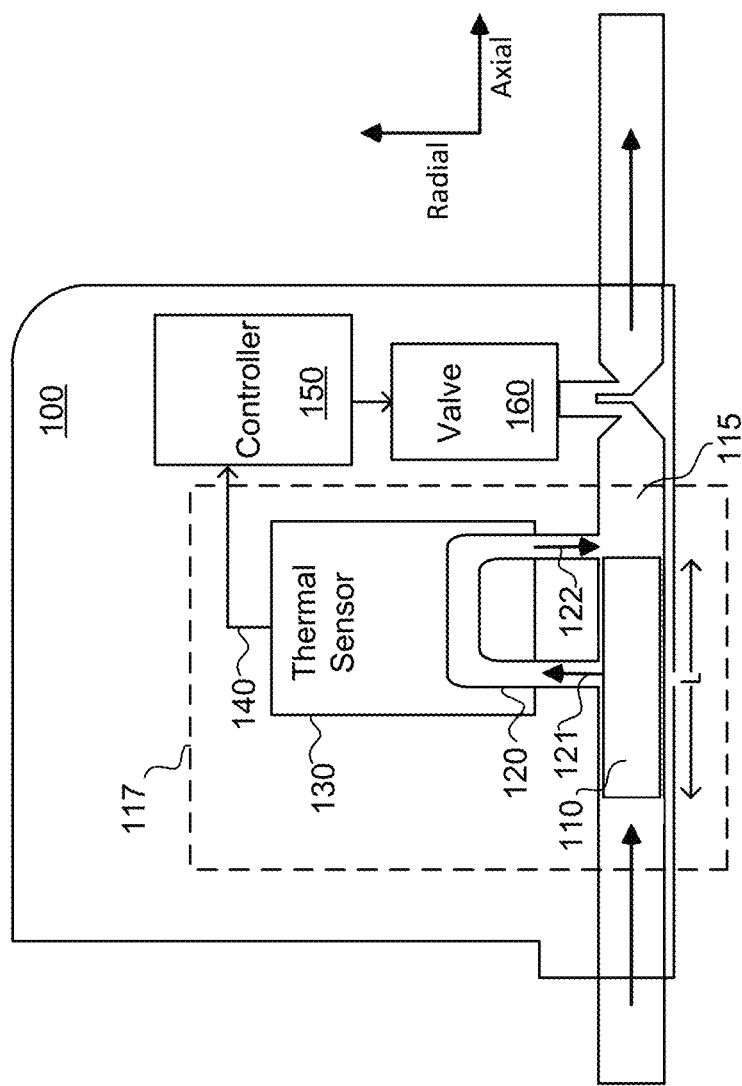
FIG. 1 is a block diagram depicting a mass flow controller and mass flow meter in which embodiments may be implemented.

Turning to aspects of the present disclosure, FIG. 1 is a block diagram of an MFC 100 that includes a thermal sensor 130 that is used to measure a mass flow rate of a gas passing through the MFC 100. Similar to the thermal sensor 1130 of the prior art mass flow controller 1100, the thermal sensor 130 measures the mass flow rate of the gas through the MFC 100 by measuring the flow rate through a sensor tube 120 that is connected to a main flow path 115 of the MFC 100. This flow rate measurement is communicated by way of a measured flow signal 140 to a controller 150 that adjusts a valve 160 to achieve a desired flow rate depending upon the application.

Although a unitary MFC 100 is depicted in FIG. 1, in some embodiments a mass flow meter 117 is separately realized apart from the controller 150 and valve 160. For example, the mass flow meter 117 may be realized by omitting the controller 150 and valve 160 so that the gas exits the mass flow meter 117 without being controlled.

When viewing FIG. 1, it should be recognized that the depiction of the components of the MFC 100 is not to scale. For example, a diameter of the sensor tube 120 is exaggerated relative to dimensions of other components (such as, for example, a length, L, of the bypass 110 along an axial direction) to show directions of gas flow through the sensor tube 120. Specifically, inlet gas flow 121 into the sensor tube 120 (flowing out of the bypass 110 along a radial direction) is shown and outlet gas flow 122 flowing out of the sensor tube 120 (back into the main flow path 115 along an opposite radial direction) to a downstream side of the bypass 110 is depicted.

Figure 11:
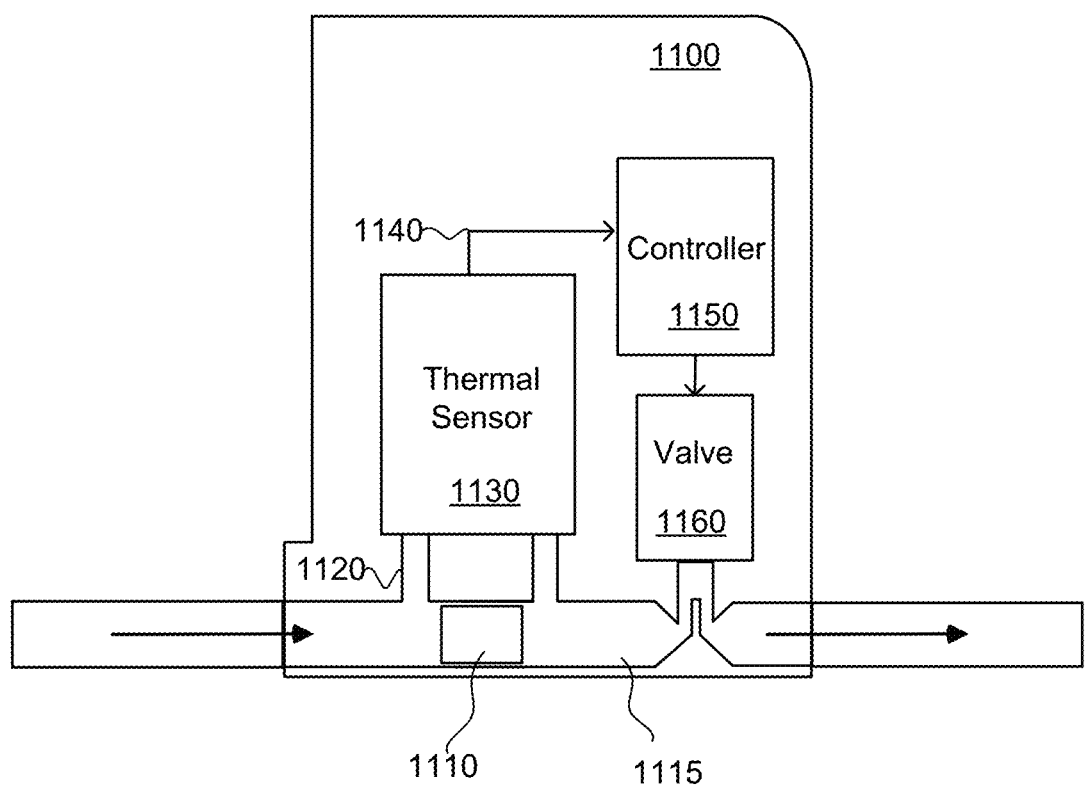
FIG. 11 is block diagram of a prior art mass flow controller.

In contrast to the MFC 1100 of the prior art depicted in FIG. 11, the sensor tube 120 of the MFC 100 depicted in FIG. 1 is positioned across only a portion of a bypass 110. In general, the bypass 110 is structurally configured so that gas flow is laminar through capillary tubes (not shown in FIG. 1) of the bypass 110 while providing a pressure differential, dP, across the sensor tube 120 that produces a flow rate through the sensor tube 120 that provides linear proportionality between the flow through the MFC 100 and a measured flow signal 140 from the thermal sensor 130.

More specifically, many variations of the bypass 110 are capable of directing a constant proportion of the gas through a main flow path 115 and the sensor tube 120 at flow rates higher than 100 SLM, and some variations of the bypass 110 are capable of directing a constant proportion of the gas through a main flow path 115 and the sensor tube 120 at flow rates higher than 200 SLM. As a consequence, even at relatively high flow rates, the flow rate of the gas through the sensor tube 120 is indicative of the flow rate of the gas flowing through the main flow path 115 of the MFC 100.

In general, a position of the bypass 110 in the main flow path 115 in connection with the internal structure of the bypass 110 causes a pressure drop, dP, across the length, L, of the bypass 110. As discussed further herein, the bypass 110 is implemented with various means for dividing the pressure drop across the bypass 110 to provide a plurality of pressure drops. Configurations of the bypass 110 discussed further herein provide means for accessing one of the plurality of the divided pressure drops so that the sensor tube 120 of the thermal sensor 130 may be positioned across one of the plurality of pressure drops to divert a desired portion of the gas through the sensor tube 120. The desired portion of the gas may be, for example, a range of gas flow values within an operating range of the thermal sensor 130.

As discussed further herein, the bypass 110 may include a continuous flow section including a plurality of continuous capillary tubes than run along the length, L, of the bypass 110. In addition, variations of the bypass 110 may be divided by creating n flow segments in the bypass 110 to produce n pressure drops, which form n−1 spaces within the bypass 110 where n is greater than or equal to 2. One or more of the spaces may be used as access spaces for the sensor tube 120 of the thermal sensor 130.

Figure 2:
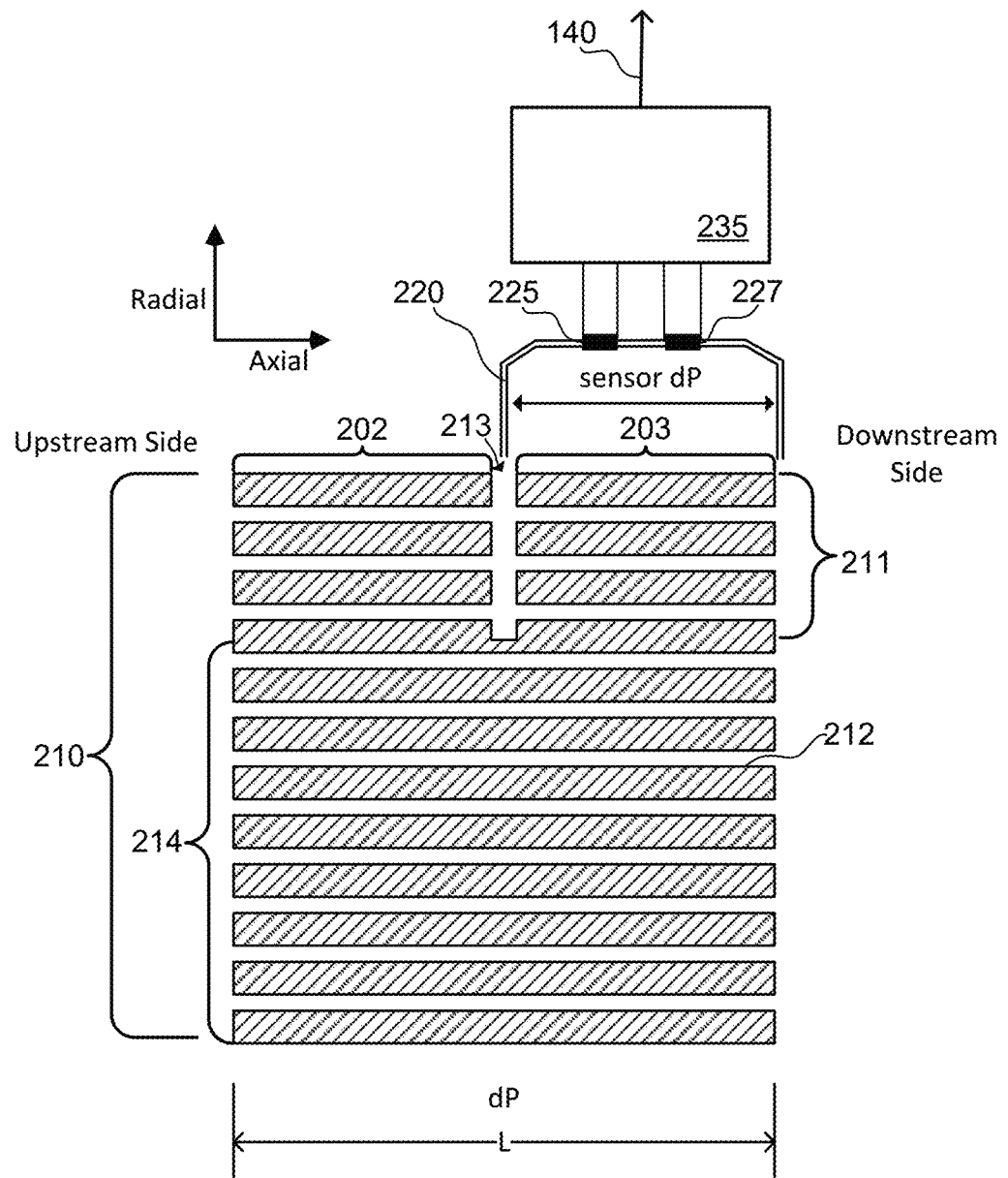
FIG. 2 is a cross section view of an exemplary bypass design.

For example, FIG. 2 depicts a cross section view of a bypass 210 with two flow segments (i.e., n=2) that may be used to realize the bypass 110 depicted in FIG. 1. As shown, the bypass 210 includes a first flow segment 202, a second flow segment 203, and a single space that functions as an access space 213. Also shown is a main continuous flow section 214 including a plurality of continuous capillary tubes having a length, L, that convey a portion of the gas (that does not flow through a measurement region 211) from an upstream side of the bypass 210 to a downstream side of the bypass 210. As shown, capillary tubes 212 of the n flow segments 202, 203 and the continuous flow section are arranged in parallel.

Overall, FIG. 2 depicts a portion of a mass flow meter including the bypass 210, which contains capillary tubes 212 with a diameter and length to satisfy the requirements for laminar flow with the pressure drop, dP, shown across the bypass 210 being linearly dependent on the flow. If the pressure drop, dP, across the bypass 210 is too high for the thermal sensor 130 to function optimally, then a portion of the bypass 210 (e.g., the second flow segment 203) can be used as a pressure divider within the measurement region 211 of the bypass 210, which will create a pressure drop, sensor dP, across the sensor tube 220 that is exactly half of the total pressure drop, dP, across the bypass 210.

The access space 213 in the measurement region 211 is at the middle of the bypass 210 (i.e., the first flow segment 202 and a second flow segment 203 are substantially equal length); thus, dividing the total pressure drop, dP, in half within the measurement region 211. As shown, the at least one access space 213 provides an inlet flow path into the sensor tube 220 for a diverted portion of the gas, and the diverted portion of the gas exits the sensor tube 220 just downstream of the bypass 210. Coupling the sensor tube 220 across the access space 213 and the downstream side of the bypass 210 provides a smaller pressure drop for the sensor tube 220; thus, reducing a flow rate of the gas through the sensor tube 220 to more optimal levels. In operation, the bypass 210 directs a constant proportion of gas through the main flow path 115 and sensor tube 220. As a consequence, the flow rate of the gas through the sensor tube 220 is indicative of the flow rate of the gas flowing through the main flow path 115 of the MFC 100.

The sensor tube 220 may be a small-bore tube that is part of the thermal sensor 130 of the MFC 100. And as shown, sensing elements 225 and 227 are coupled to (e.g., wound around) the outside of sensor tube 220. In one illustrative embodiment, sensing elements 225 and 227 are resistance-thermometer elements (e.g., coils of conductive wire), but other types of sensors (e.g., resistance temperature detectors (RTD) and thermocouples) may also be utilized. Moreover, other embodiments may certainly utilize different numbers of sensors and different architectures for processing the signals from the sensors without departing from the scope of the present invention.

As depicted, sensing elements 225 and 227 are electrically connected to a sensing-element circuit 235 that may be included in the thermal sensor 130. In general, the sensing-element circuit 235 is configured (responsive to signals from the sensing elements 225, 227) to provide the measured flow signal 140, which is indicative of the flow rate through the sensor tube 120, and hence, indicative of the flow rate through the main flow path 115 of the MFC 100. More specifically, the measured flow signal 140 is defined by a temperature profile along the sensor tube 120 that affects a temperature difference between the sensing elements 225, 227. As an example, without limitation, the sensing element circuit 235 may be implemented with a Wheatstone bridge circuit topology well known to those of ordinary skill in the art. Those of ordinary skill in the art are also familiar with processing techniques to convert the measured flow signal 140 to the digital domain and use an analog or digital version of the measured flow signal 140 in a feedback loop (to control the valve 160) and/or to provide a display of the measured flow rate to an operator via a display (no shown) of the MFC 100.

Figure 3:
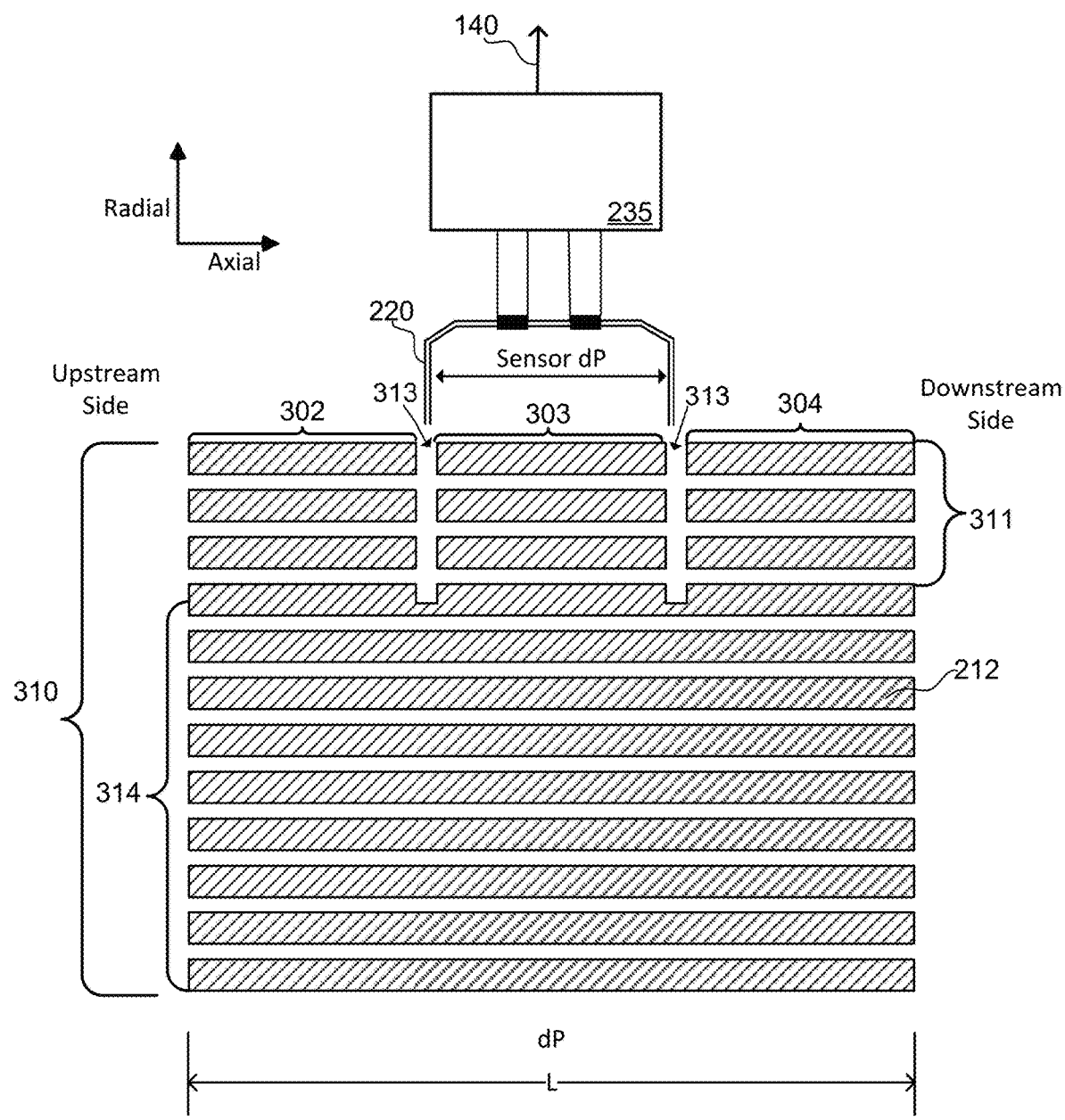
FIG. 3 is a cross section view of another bypass design.

In another embodiment shown in FIG. 3, a measurement region 311 of a bypass 310 can be divided into three segments (i.e., n=3): a first segment 302, a second segment 303, and a third segment 304 forming three pressure drops and two spaces used as access spaces 313 within a measurement region 311 of the bypass 310 where one of the access spaces 313 is upstream from the other access space 313. As shown, the upstream access space 313 provides an inlet flow path along a radial direction for a diverted portion of the gas to enter the sensor tube 220, and the downstream access space 313 provides an exit flow path (out of the sensor tube) for the diverted portion of the gas to exit the sensor tube 220 along an opposite radial direction.

The multiple access points may be uniformly distributed along the bypass 310, and as a result, the length of the segmented capillary tubes within each of the first segment 302, the second segment 303, and the third segment 304 of the measurement region 311 of the bypass 310 will be the same. Also shown is a continuous flow section 314 including a plurality of continuous capillary tubes having a length, L, that convey a portion of the gas from an upstream side of the bypass 310 to a downstream side of the bypass 310. As shown, capillary tubes 212 of then flow segments 302, 303, 304 and the continuous flow section 314 are arranged in parallel.

The substantially identical length of each capillary tube segment in the measurement region 311 produces three substantially equal pressure drops across each segment. In cases of a local non-linearity between a pressure drop across individual capillary tube segments and flow through capillary tube segments, this substantially identical length enables the total pressure drop, dP, across the bypass 310 to be equally divided by the number, n, of flow segments to obtain a substantially identical pressure drop across each capillary tube segment.

In many implementations, the bypass 110 may be realized by different axially aligned pieces. A side view of a bypass 410 is shown in FIG. 4A, for example, that is formed by an alternating placement of a first piece 410B that has a circular cross-sectional area, as shown in FIG. 4B, and a second piece 410C that has a truncated circular cross-sectional area as shown in FIG. 4C. The truncated portion of the cross-sectional area of the second piece 410C defines spaces that are configured as access spaces 413 in the measurement region 411 of the bypass 410.

In another embodiment shown in FIGS. 5A-5C, the cross-sectional area of a bypass 510 at each space that is configured as an access space 513 in a measurement region 511 can be formed by a notch 515 in an overall circular cross-sectional area. A side view of the bypass 510 is shown in FIG. 5A that is formed by alternating placement of a first piece 510B that has a circular cross-sectional area, as shown in FIG. 5B, and a second piece 510C that has a circular cross-sectional area with the notch 515 as shown in FIG. 5C.

FIGS. 6A-6C show yet another aspect of a bypass 610 that allows for a radially symmetric cross-sectional area of a measurement region 611 where the cross-sectional area of the bypass 610 at each space configured as an access space 613 has a smaller, circular cross-sectional area than a first piece 610B of the bypass 610. The measurement region 611 in the bypass 610 is defined by the outer edge of a second piece 610C (shown in FIG. 6C) that has a smaller, circular cross-section and an outer portion of the first piece 610B (shown in FIG. 6B); thus, the measurement region 611 axially spans along an outer ring of bypass 610. This radial symmetry of the measurement region 611 depicted in FIG. 6A may mitigate against the measurement region 611 excessively influencing the overall flow distribution of the bypass 610.

In another embodiment shown in FIGS. 7A-7C, the cross-sectional area of a bypass 710 at each space contains a thin slit 715 that functions as an access space 713 that is connected to a central hole. Thus, the measurement region 711 is primarily disposed in the center of the bypass 710. A side view of the bypass 710 is shown in FIG. 7A that is formed by alternating a first piece 710B that has a circular cross-sectional area, as shown in FIG. 7B, and a second piece 710C that has a circular cross-sectional area with the thin slit 715 as shown in FIG. 7C. These exemplary embodiments allow for a lessened influence on the overall flow distribution by the measurement region 711, while maintaining access point functionality in coupling to the sensor tube 220.

In another aspect of the current disclosure, the capillary tube diameter within a measurement region and a main continuous section of a bypass can vary according to performance requirements; although, in some instances it may still be desirable to have a single diameter for all capillary tubes within the bypass, e.g., to provide uniform flow distribution.

Figure 8A:
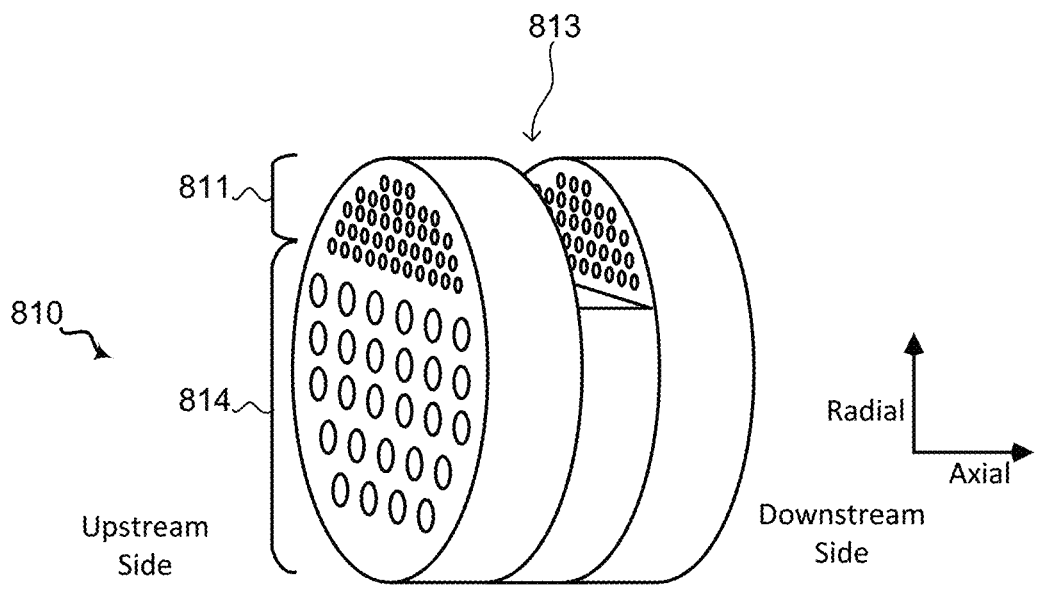
FIG. 8A is an isometric view of yet another bypass.
Figure 8B:
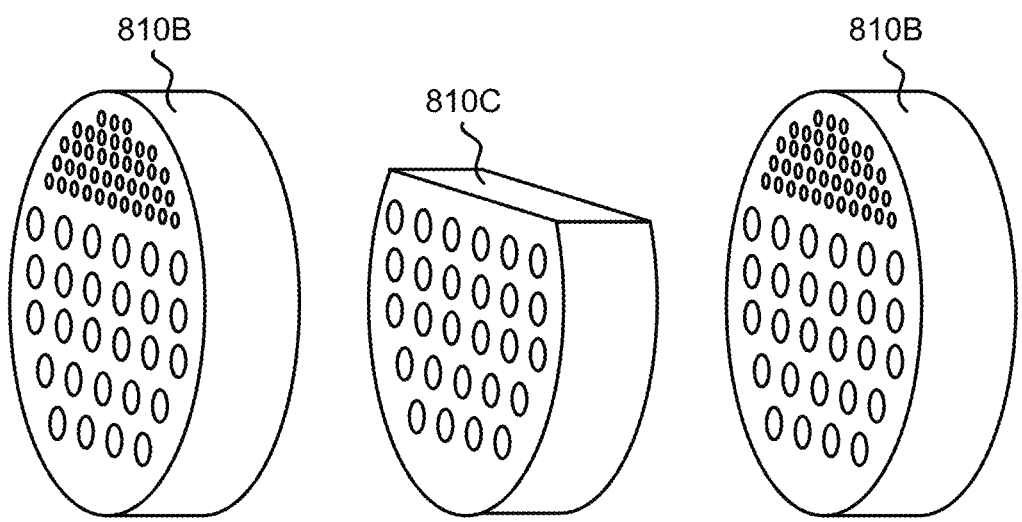
FIG. 8B is an isometric view of constituent components of the bypass depicted in FIG. 8A.

For example, FIGS. 8A and 8B show an aspect of the current disclosure in which the capillary tube diameter within a measurement region 811 is smaller than the capillary tube diameter in a main continuous flow section 814 of the bypass 810. FIG. 8A depicts an assembled view of the bypass 810, and FIG. 8B depicts constituent pieces of the bypass 810: a first piece 810B, and a second piece 810C. In some cases, smaller capillary tube diameters can be used to improve the linearity of the pressure drop to flow relationship at the measurement region 811 of the bypass 810, which can improve thermal sensor accuracy. As a result, the scaling of the capillary tube diameter in the measurement region 811 of the bypass 810 can be tailored to meet the needs of a specific application. Similarly, the size of an access spaces 813 can be tailored to interface properly with a given sensor tube.

It should be recognized that in general, the capillary tube diameter in the measurement region may be different from the capillary tube diameter in the main continuous region in any one of the design variations disclosed herein. For example, the designs of the bypass depicted in FIGS. 1-7C may, similar to the design depicted in FIGS. 8A and 8B, also use a smaller tube diameter in a measurement region than a main continuous bypass region.

Figure 9A:
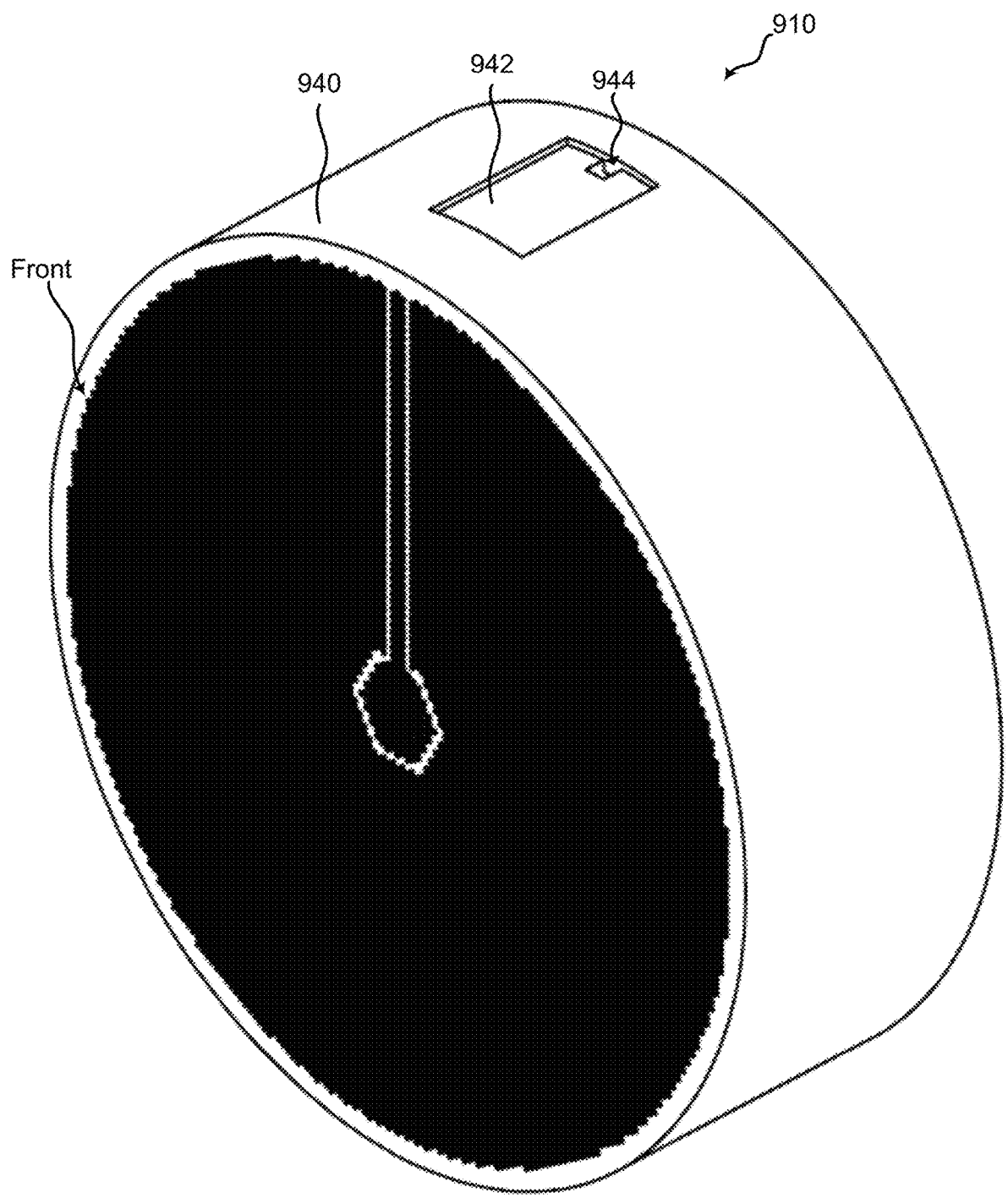
FIG. 9A is an isometric view of yet another bypass.

Referring next to FIG. 9A, shown is an isometric view of yet another bypass 910. As shown, the bypass 910 includes capillary tubes that each have an inlet at a front, upstream face of the bypass 910, and the capillary tubes run from the front face, parallel to an outer surface 940 of the bypass, to a rear, downstream face (not shown in FIG. 9A). In this bypass 910, the outer surface 940 includes a recessed portion 942 and an aperture 944 that connects to one of four spaces 946 depicted in FIG. 9C.

Figure 9B:
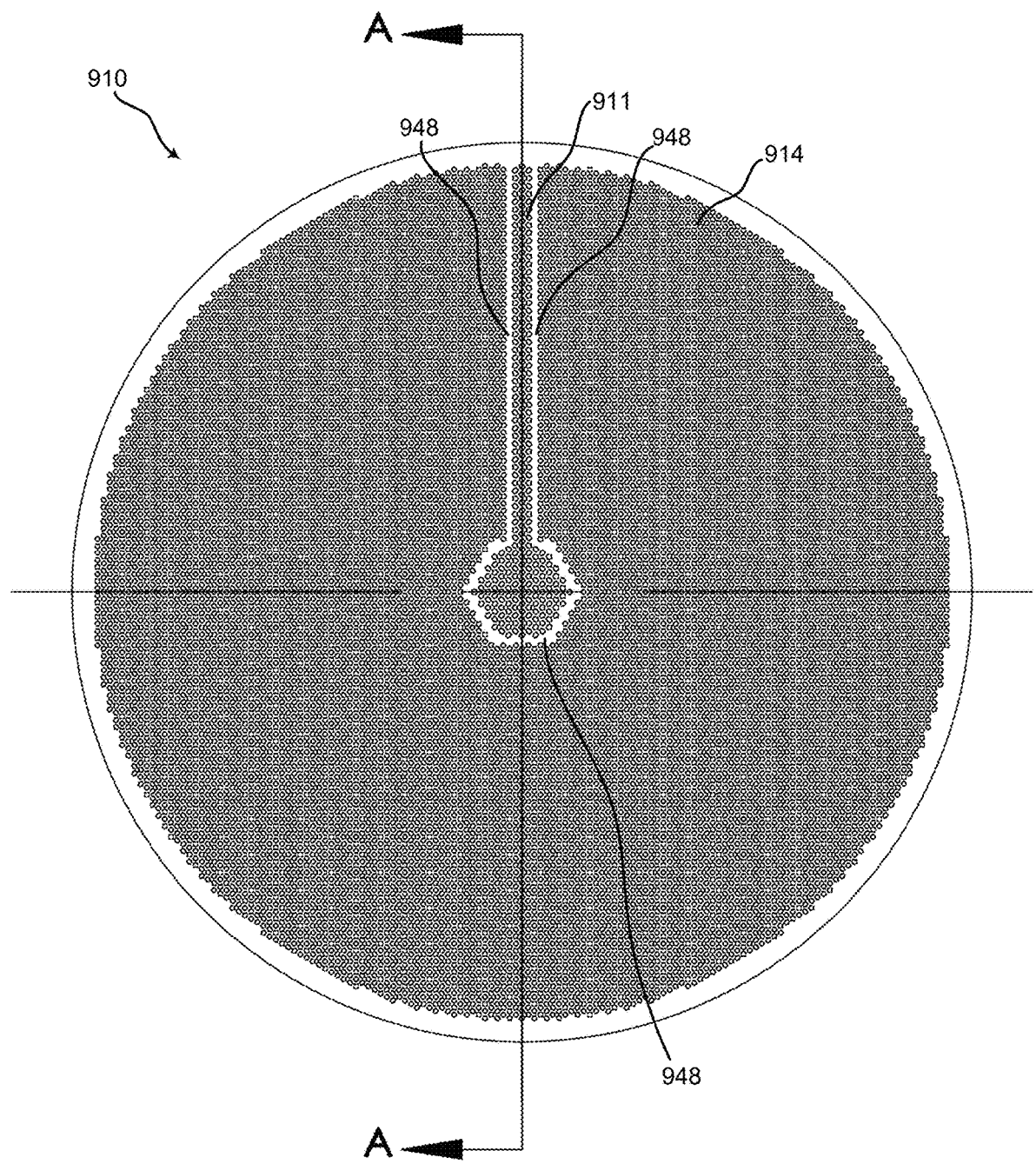
FIG. 9B is a front view of the bypass depicted in FIG. 9A.

FIG. 9B depicts a front view of the bypass 910 depicted in FIG. 9A. As shown, the bypass 910 includes a measurement region 911 and a continuous flow section 914. In this design, the bypass 910 includes a wall 948 that isolates the measurement region 911 from the continuous flow section 214.

Figure 9C:
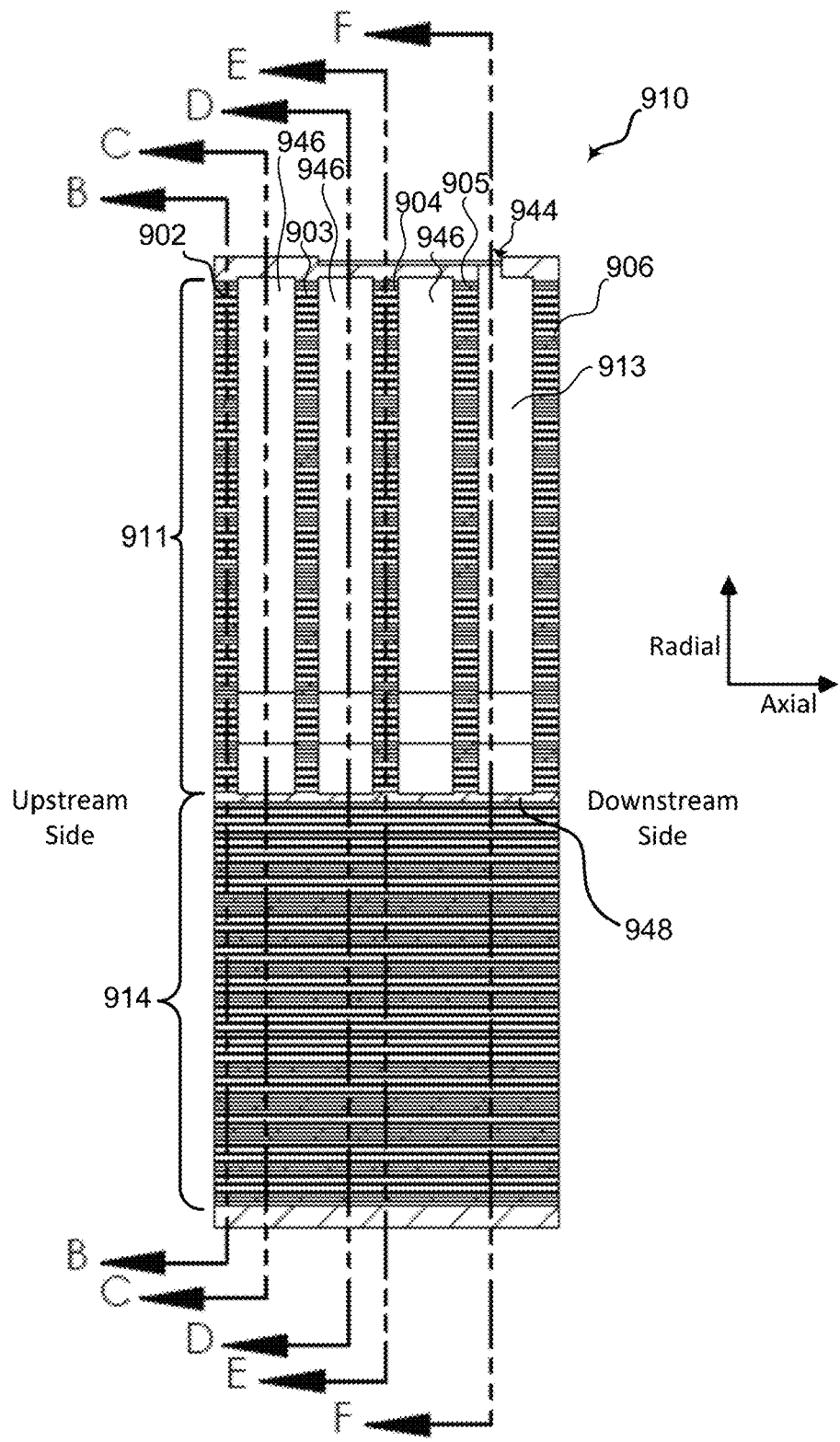
FIG. 9C is a cross section view along section A-A of FIG. 9B.

FIG. 9C is a section view along section A-A in FIG. 9B. FIG. 9C depicts a measurement region 911 with five pressure drops that includes four spaces 946 (where one of the spaces 946 is an access space 913) formed by cavities between five flow segments: a first flow segment 902, a second flow segment 903, a third flow segment 904, a fourth flow segment 905, and a fifth flow segment 906. As depicted, each of the flow segments in the measurement region 911 includes a plurality of parallel capillary tubes that run along an axial direction in the bypass 910. Also shown in FIG. 9C is a continuous flow section 914 that includes a plurality of capillary tubes that run along the axial direction, in parallel, without any breaks in the capillary tubes.

Figure 9D:
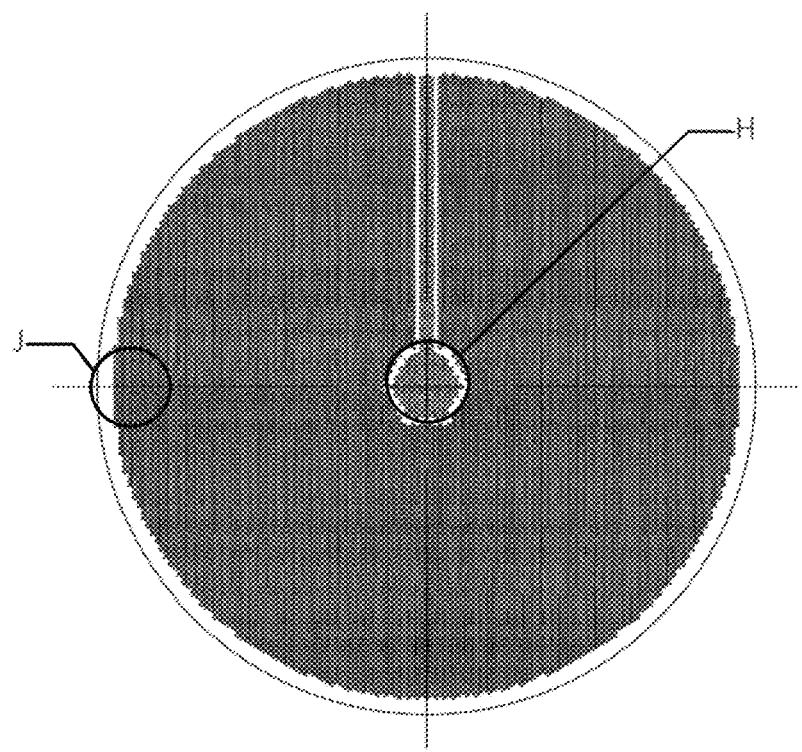
FIG. 9D is a cross section view along section B-B of FIG. 9C.

FIG. 9D is a view of the bypass along section B-B of FIG. 9C, which is a section view of the first flow segment 902. As shown, the first flow segment 902 is made up of capillary tubes in the measurement region 911 that allow gas to flow between the first flow segment 902 and the second flow segment 903.

Figure 9E:
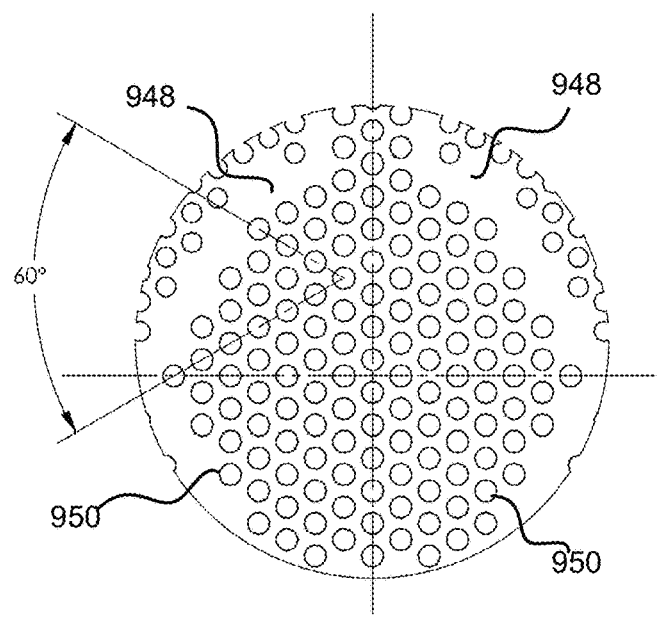
FIG. 9E is a detailed view of the portion H depicted in FIG. 9D.

FIG. 9E depicts a detailed view of a portion H shown in a center portion of the section of FIG. 9D. Although not required, the bypass 910 may be constructed by many circular, etched, sheets that are co-axially stacked together to form the capillary tubes 950 of the bypass 910. As shown in FIG. 9E, the sheets may be etched to form holes, and when stacked along the axial direction, the sheets form the capillary tubes. The absence of holes may be used to form the wall 948 in the bypass 910 between the measurement region 911 and the continuous flow section 214. The sheets of the bypass 910 may be made from corrosion resistant material such as corrosion resistant stainless steel (e.g., 316L) or super alloys such as Hastelloy.

Figure 9F:
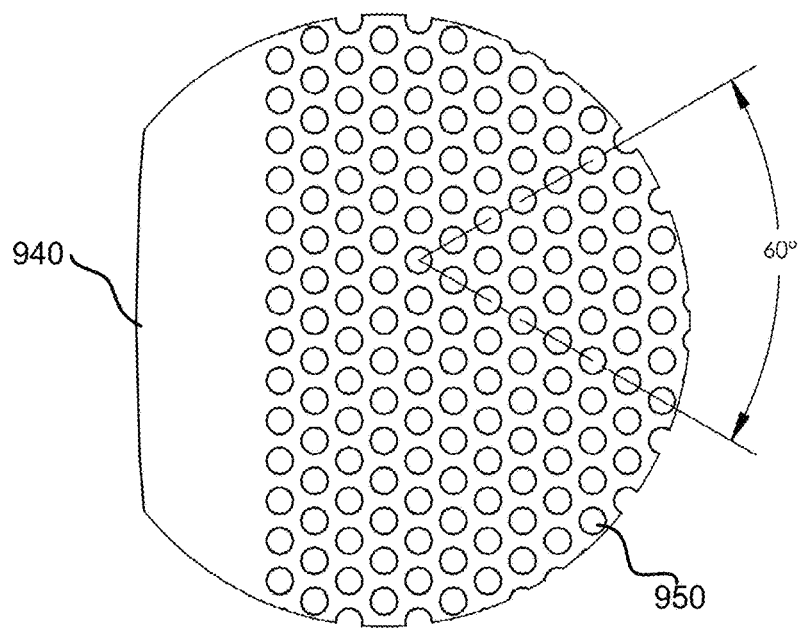
FIG. 9F is a detailed view of the portion J depicted in FIG. 9D.

FIG. 9F. depicts a detailed view of a portion J, of the section depicted in FIG. 9D. As shown, the absence of holes forms the outer surface 940 of the bypass 910.

Figure 9G:
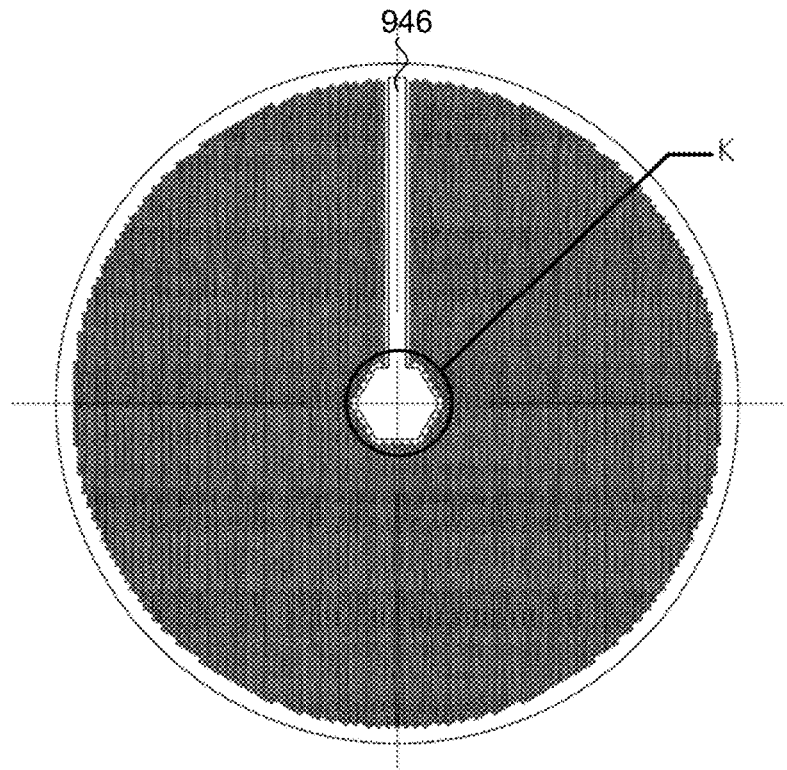
FIG. 9G is a cross section view along section C-C of FIG. 9C.
Figure 9H:
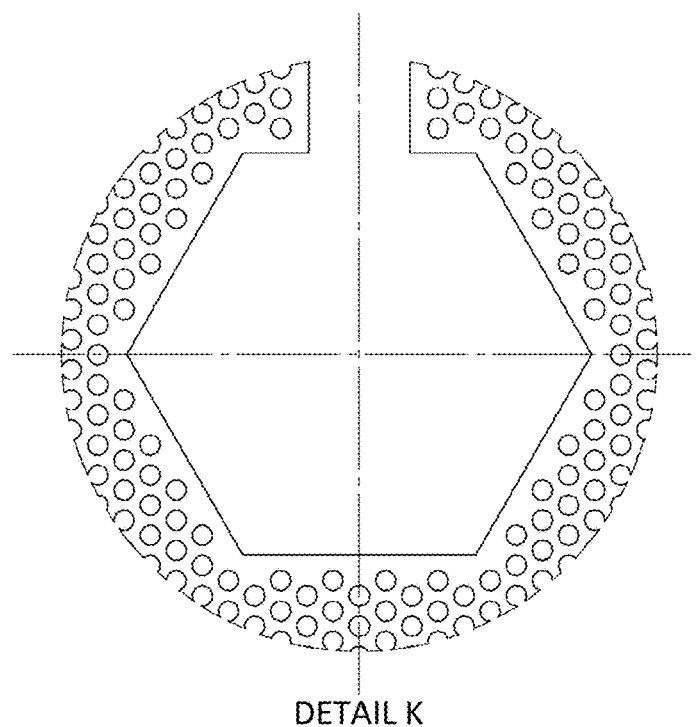
FIG. 9H is a detailed view of the portion K depicted in FIG. 9G.

Referring next to FIG. 9G, shown is a view along section C-C of FIG. 9C, which includes a portion of the space 946 formed between the first flow segment 902 and the second flow segment 903. As shown, the space 946 is a key-shaped slot that may be formed by etching through sheets of the bypass 910. FIG. 9H depicts a detailed view of a portion K shown in the section C-C of FIG. 9G. Collectively, sheets with a cross section depicted in FIG. 9G form the space 946 between the first flow segment 902 and the second flow segment 903. It should be recognized, however, that the bypass 910 may be constructed without assembling sheets together.

Figure 9I:
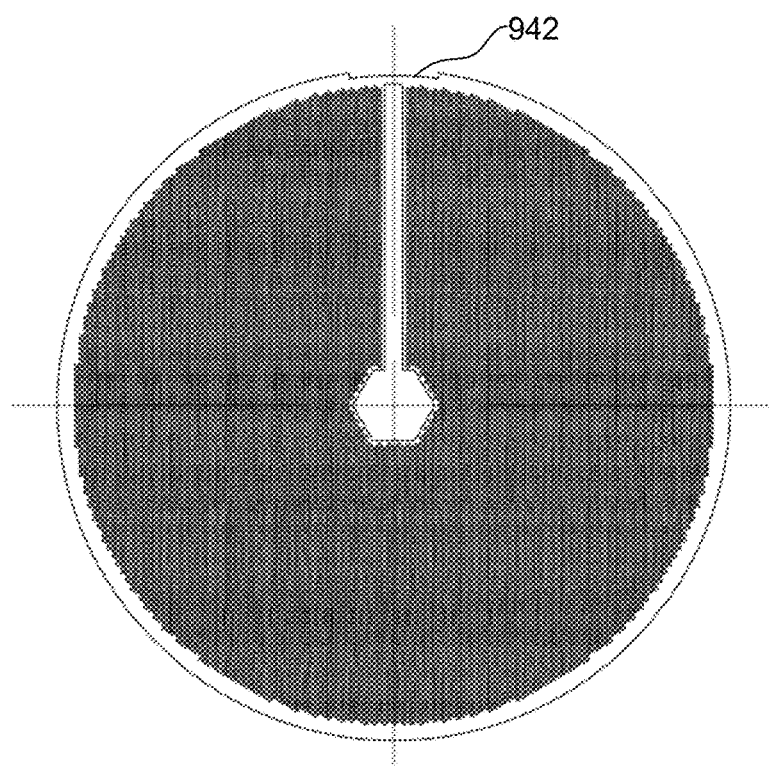
FIG. 9I is a cross section view along section D-D of FIG. 9C.

FIG. 9I shows a view along section D-D of FIG. 9C, which depicts a portion of a space 946 between the second flow segment 903 and the third flow segment 904. The section in FIG. 9I is similar to the section FIG. 9G except that the section in FIG. 9I includes a portion of the recessed portion 942.

Figure 9J:
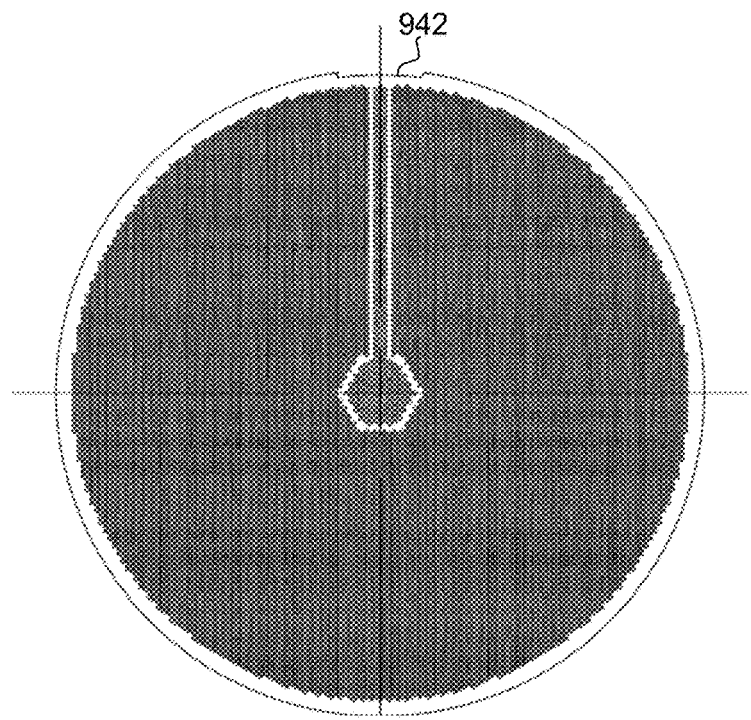
FIG. 9J is a cross section view along section E-E of FIG. 9C.

FIG. 9J shows a section view along section E-E of FIG. 9C, which shows a portion of the third flow segment 904. The section depicted in FIG. 9J is similar to the section depicted in FIG. 9D except the section depicted in FIG. 9J includes a section view of the recessed portion 942, which is depicted at a top of this section of the bypass 910.

Figure 9K:
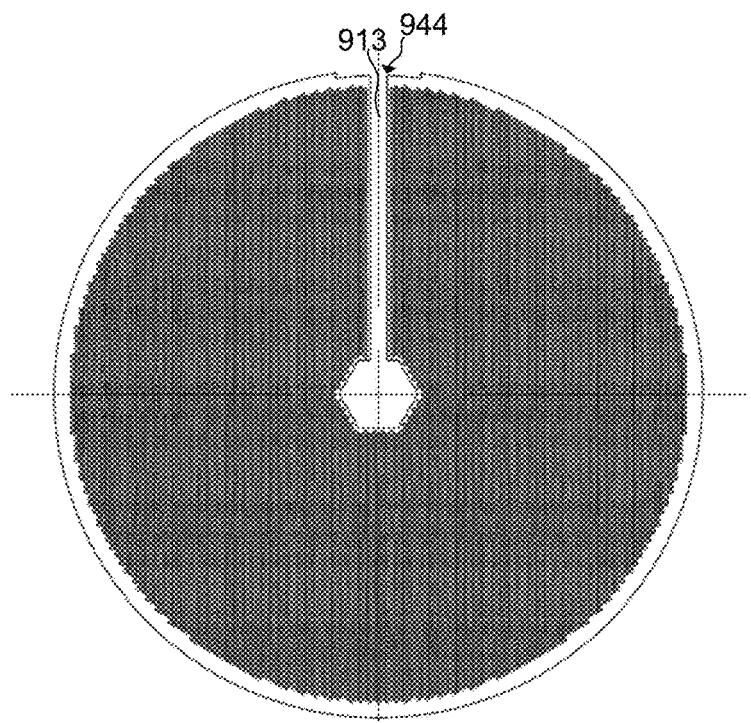
FIG. 9K is a cross section view along section F-F of FIG. 9C.
Figure 10A:
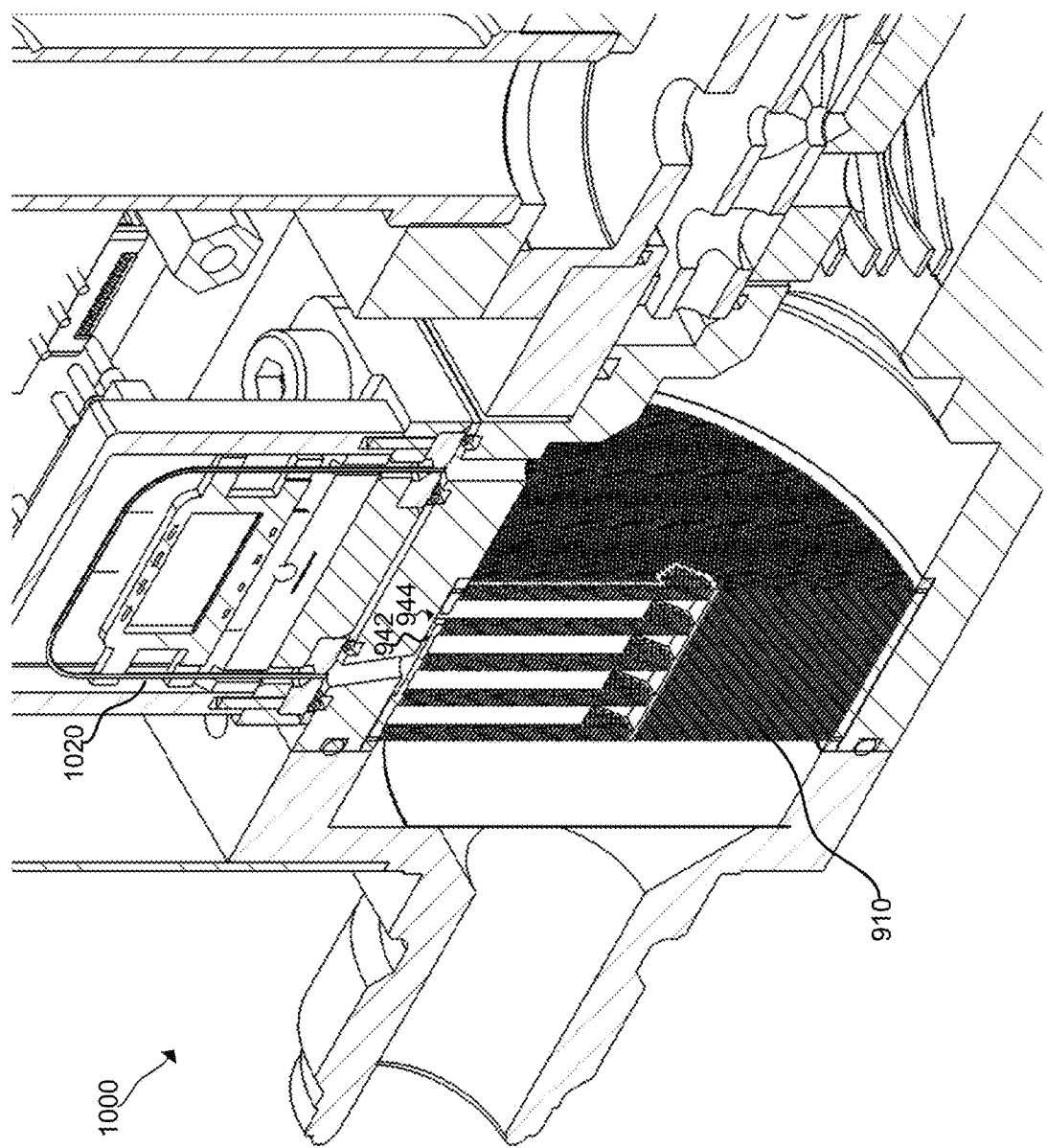
FIG. 10A is an isometric section view of a portion of a mass flow meter that incorporates the bypass depicted in FIGS. 9A to 9G.

FIG. 9K shows a view along section F-F of FIG. 9C, which depicts a portion of the access space 913 between the fourth flow segment 905 and the fifth flow segment 906. Also shown is FIG. 9K is the aperture 944, which functions as an inlet to a sensor tube 1020 as shown in FIG. 10A, which is an isometric section view of a mass flow meter 1000 that incorporates the bypass 910. FIG. 10B is a section view of the mass flow meter 1000 in FIG. 10A.

As shown by directional arrows in FIG. 10B, a gas enters the mass flow meter 1000 via a main flow path 1015 and a portion of the gas flows through the capillary tubes of the continuous flow section 914 (that have a length L) and a remaining portion of the gas flows through the measurement region 911, which includes the n flow segments 902, 903, 904, 905, 906 (where n=5) and the n−1 spaces 946. As shown, a sensor tube 1020 of a thermal flow sensor 1030 is positioned across the fifth flow segment 906 to cause a diverted portion 1080 of the gas to flow around the fifth flow segment 906, through the sensor tube 1020.

In this implementation, a substantially constant proportion of the gas through the main flow path 1015 and the sensor tube 1020 is maintained. Moreover, the n flow segments provide a means for dividing the entire pressure drop, dP, (across the length, L, of the bypass 910) to provide a plurality of pressure drops, and each of the plurality of pressure drops is within an operating range of the thermal sensor 1030. And more specifically, the pressure drop across the fifth flow segment 906 is within an operating range of the thermal sensor 1030. As a consequence, a flow rate of the gas through the sensor tube 1020 is indicative of the flow rate of the gas flowing through the main flow path 1015 of the mass flow meter 1000.

In this implementation, means for accessing the pressure drop across the fifth flow segment 906 is provided by the aperture 944 that connects the access space 913 to the recessed portion 942. And the recessed portion 942 of the bypass 910 forms a flow cavity between a body 1082 of the mass flow meter 1000 and the bypass 910, and the cavity feeds to a conduit 1070 that is coupled between the recessed-formed cavity and an inlet of the sensor tube 1020. Thus, the aperture 944, recessed portion 942, and conduit 1070 provide an inlet flow path for the diverted portion of the gas between the inlet of the sensor tube 1020 and the access space 913. As shown, an exit conduit 1072 through the body 1082 of the mass flow meter 1000 couples the outlet of the sensor tube 1020 to a downstream side of the bypass 910; thus providing an exit flow path for the portion of the gas diverted through the sensor tube 1020.

For clarity, FIGS. 10A and 10B do not show components of the thermal sensor 1030, but those of ordinary skill in the art are very familiar with a variety of sensing sensing elements and sensing element circuits that are used in connection with the sensor tube 1020 (as described with reference to FIG. 2, for example) to produce a measured flow signal 140 indicative of the flow rate of the diverted portion 1080 of the gas.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mass flow meter comprising,
   a main flow path for a gas;
   a bypass with a length, L, within the main flow path, the bypass including:
   a continuous flow section including a plurality of continuous capillary tubes, each of the plurality of continuous capillary tubes having a length, L;
   n flow segments forming n−1 spaces within the bypass where n is greater than or equal to 2, each of the n flow segments having a plurality of capillary tubes;
   at least one thermal sensor including a sensor tube, the sensor tube positioned across at least one of the n flow segments to divert a portion of the gas around the at least one of the flow segments and provide a measured flow signal in response to the diverted portion of the gas.

2. The mass flow meter of claim 1, wherein the sensor tube includes an inlet and an outlet, the inlet is positioned along the bypass to provide an inlet flow path for the portion of the gas between the inlet and an upstream one of the n−1 spaces, and the outlet is positioned to provide an exit flow path for the portion of the gas between the outlet and a downstream one of the n−1 spaces.

3. The mass flow meter of claim 1, wherein the sensor tube includes an inlet and an outlet, the inlet positioned along the bypass to provide an inlet flow path for the portion of the gas between the inlet and one of the n−1 spaces, and the outlet positioned to provide an exit flow path for the portion of the gas between the outlet and a downstream side of the bypass.

4. The mass flow meter of claim 1, wherein each of then flow segments have an equal length.

5. The mass flow meter of claim 1, wherein the n flow segments and the continuous flow section are arranged in parallel.

6. A mass flow meter comprising:
   a main flow path for a gas;
   a bypass with a length, L, within the main flow path, the bypass including:
   means for creating a pressure drop, dP, across the bypass;
   means for dividing the pressure drop across the bypass to provide a plurality of pressure drops;
   means for accessing one or more of the plurality of the pressure drops;
   at least one thermal sensor including a sensor tube, the sensor tube coupled to the means for accessing to position the sensor tube across one of the plurality of pressure drops to divert a portion of the gas through the sensor tube, and the at least one thermal sensor is configured to provide a measured flow signal in response to the diverted portion of the gas.

7. The mass flow meter of claim 6, wherein the means for dividing the pressure drop across the bypass includes means for dividing the pressure drop in half.

8. The mass flow meter of claim 6, wherein the means for dividing the pressure drop across the bypass includes means for dividing the pressure drop into three pressure drops.

9. The mass flow meter of claim 6, wherein the means for dividing the pressure drop across the bypass includes means for dividing the pressure drop into five pressure drops.

10. The mass flow meter of claim 6, wherein the means for dividing the pressure drop across the bypass includes means for dividing the pressure drop into equal pressure drops.

\* \* \* \* \*